(12) United States Patent
Ohnuma

(10) Patent No.: US 7,201,627 B2
(45) Date of Patent: Apr. 10, 2007

(54) METHOD FOR MANUFACTURING ULTRAFINE CARBON FIBER AND FIELD EMISSION ELEMENT

(75) Inventor: Hideto Ohnuma, Kanagawa (JP)

(73) Assignee: Semiconductor Energy Laboratory, Co., Ltd., Kanagawa-ken (JP)

( * ) Notice: Subject to any disclaimer, the term of this patent is extended or adjusted under 35 U.S.C. 154(b) by 252 days.

(21) Appl. No.: 10/900,431

(22) Filed: Jul. 28, 2004

(65) Prior Publication Data

US 2005/0026531 A1    Feb. 3, 2005

(30) Foreign Application Priority Data

Jul. 31, 2003    (JP) .............................. 2003-283827

(51) Int. Cl.
*H01J 9/04*    (2006.01)
(52) U.S. Cl. ............................. 445/50; 445/51; 445/49
(58) Field of Classification Search ............ 445/49–51
See application file for complete search history.

(56) References Cited

U.S. PATENT DOCUMENTS

| | | | |
|---|---|---|---|
| 5,686,791 A * | 11/1997 | Kumar et al. ............... | 313/495 |
| 5,973,444 A * | 10/1999 | Xu et al. .................... | 313/309 |
| 6,146,230 A | 11/2000 | Kim et al. | |
| 6,232,706 B1 * | 5/2001 | Dai et al. .................... | 313/309 |
| 6,277,318 B1 * | 8/2001 | Bower et al. ............... | 264/346 |
| 6,350,488 B1 * | 2/2002 | Lee et al. ................... | 427/249.1 |
| 6,465,132 B1 * | 10/2002 | Jin .............................. | 429/231.8 |
| 6,648,711 B1 | 11/2003 | Jang et al. | |
| 6,976,897 B2 * | 12/2005 | Choi et al. .................. | 445/24 |
| 7,081,030 B2 * | 7/2006 | Liu et al. .................... | 445/24 |
| 2003/0184235 A1 | 10/2003 | Nakamura | |
| 2004/0023514 A1 | 2/2004 | Moriya et al. | |

FOREIGN PATENT DOCUMENTS

| | | |
|---|---|---|
| EP | 1 061 544 A1 | 12/2000 |
| JP | 2000-086216 | 3/2000 |
| JP | 2000-100318 | 4/2000 |
| JP | 2001-023508 | 1/2001 |
| JP | 2001-068016 | 3/2001 |

OTHER PUBLICATIONS

"Carbon Nanotube: an Expected Material Development", CMC Corp., Nov. 10, 2001, pp. 3-4 with English translation of Section 2.

\* cited by examiner

*Primary Examiner*—Nimeshkumar D. Patel
*Assistant Examiner*—Dalei Dong
(74) *Attorney, Agent, or Firm*—Nixon Peabody LLP; Jeffrey L. Costellia

(57) ABSTRACT

A method for manufacturing an ultrafine carbon fiber of the present invention has several steps as follows. In the first step, a semiconductor film is formed over a surface having insulative. In the second step, a first treatment is performed so that a metal element or a silicide of the metal element is segregated on a crystal grain boundary of the semiconductor film after adding the metal element in the semiconductor film. In the third step, a second treatment is performed so that an ultrafine carbon fiber on the surface of the metal element or the silicide of the metal element is formed.

35 Claims, 13 Drawing Sheets

METHOD FOR MANUFACTURING ULTRAFINE CARBON FIBER AND FIELD EMISSION ELEMENT

BACKGROUND OF THE INVENTION

1. Field of the Invention

The present invention relates to a method for manufacturing an ultrafine carbon fiber such as a graphite nanofiber, a carbon nanofiber, a carbon nanotube, tubular graphite, a carbon nanocone having a thin and sharp edge, corn shape graphite, or the like and a field emission element having the ultrafine carbon fiber.

2. Description of the Related Art

In recent years, an ultrafine carbon fiber is expected to be applied to various devices. Accordingly, various methods for manufacturing an ultrafine carbon fiber are examined.

An arc discharge method, laser vaporization, CVD (Chemical vapor deposition), or the like is used for a typical manufacturing method of an ultrafine carbon fiber (Reference 1).

There are an ultrafine carbon fiber such as a carbon nanotube (hereinafter, referred to as a CNT), a carbon nanofiber, a graphite nanofiber, tubular graphite, a carbon nanocone having a thin and sharp edge, or corn shape graphite, a fullerene, and the like as a typical example of an ultrafine carbon fiber.

A CNT refers to cylindrical graphite having a nanometer size. There are a single-walled nanotube and a multi-walled nanotube as a CNT. A single-walled nanotube is a tube in which a sheet of a graphene sheet (a carbon hexagonal net plane of a single atomic layer) is cylindrically closed and the diameter is about from 1 nm to 10 nm and the length is from 1 μm to 100 μm. A multi-walled nanotube is a tube in which cylindrical graphene sheets are laminated, and the outside diameter is from 5 nm to 50 nm, the diameter of a central cavity is from 3 nm to 10 nm, and the length is from 1 μm to 100 μm.

A CNT has a sharp edge and a needle shape, is thermally and chemically stable, mechanically strong, and has properties of having conductivity or the like. The CNT is applied to a probe of a Scanning Probe Microscope (SPM), a field emission element of a field emission display device (hereinafter, referred to as a FED), and a channel region of a FET (Field Effect Transistor). In addition, a negative electrode material of a lithium battery, a gas occluding substance, or the like is studied by making a use of a structure in one-dimensional pores having substantially large space in a tube or between tubes.

An ultrafine carbon fiber is applied as a field emission element of a field emission display device since it has a low work function and has negative electron affinity.

As described in Reference 2, a method for forming a metal dot over a silicon substrate surface that is partly exposed, applying a magnetic field to the metal dot with an electromagnet in a vertical direction to the silicon substrate surface, and forming an electron emission portion by growing a CNT between the metal dot and the silicon substrate while absorbing the metal dot is used as an example of a manufacturing method using an ultrafine carbon fiber for a field emission element of a FED (Reference 2).

Reference 1: "Carbon nanotube: an expected material development," CMC Corp., Nov. 11, 2001, pp. 3–4.

Reference 2: Japanese Patent Laid-Open No. 2000-86216

However, it is difficult to control separately a diameter and a length of an ultrafine carbon fiber in the conventional manufacturing method, and has a problem of large variation in a diameter. Generally, when an ultrafine carbon fiber such as a CNT is formed using a metal film as a catalyst, it is said that the diameters depend on the diameter of the metal film. In Reference 2, a CNT is formed using a metal dot as a catalyst; however, a step of forming a metal film of from several nm to several ten nm is complicated, that is, it is difficult to control a diameter of a CNT, which is problematic.

SUMMARY OF THE INVENTION

In the above problems, an object of the present invention is to provide a method for manufacturing an ultrafine carbon fiber that is capable of controlling a diameter. An object of the invention is also to propose a method for manufacturing a field emission element in which an electron emission portion is formed of an ultrafine carbon fiber and which is possible to control the density and the diameter thereof.

As one feature of the invention, a size and density of a metal element or a silicide of the metal element is controlled and the metal element or a silicide of the metal element is cohered on a crystal grain boundary of a semiconductor film, and an ultrafine carbon fiber is formed by using the metal element or the silicide of the metal element as a core.

In addition, as one feature of the invention, density of a multipoint in a crystal grain of a semiconductor film formed over a surface having insulative is controlled, and a metal element or a silicide of the metal element is cohered on the multipoint surface. Thereafter, heat treatment or plasma treatment is carried out in an atmosphere containing carbon to form an ultrafine carbon fiber, thereby dissociating the ultrafine carbon fiber from a crystalline semiconductor film.

Moreover, as one feature of the invention, a size and density of a metal element or a silicide of the metal element is controlled and the metal element or the silicide of the metal element is cohered on a crystal grain boundary of a semiconductor film, and a field emission element in which an ultrafine carbon fiber serves as an electron emission portion is formed by using the metal element or the silicide of the metal element as a core.

Furthermore, as one feature of the invention, density of a multipoint in a crystal grain of a semiconductor film formed over a surface having insulative is controlled, and a metal element or a silicide of the metal element is cohered on the multipoint surface. Thereafter, heat treatment or plasma treatment is carried out in an atmosphere containing carbon to form a field emission element having an electron emission portion formed of an ultrafine carbon fiber.

An electron emission portion formed in the invention is formed over a surface of a cathode electrode of a field emission element. The cathode electrode is formed of a crystalline semiconductor film and the electron emission portion is formed of an ultrafine carbon fiber such as a CNT, a carbon nanofiber, a graphite nanofiber, tubular graphite, a carbon nanocone having a thin and sharp edge, or a corn shape graphite.

According to the invention, as a method for forming a metal element or a silicide of the metal element on a multipoint of a crystalline semiconductor film, a metal element is added over an amorphous semiconductor film. Thereafter, the metal element or the silicide of the metal element is formed on a multipoint of a crystal grain as well as the amorphous semiconductor film is crystallized to form a crystalline semiconductor film.

In addition, according to the invention, as a method for forming a metal element or a silicide of the metal element at a multipoint of a crystalline semiconductor film, a metal element is added over a crystalline semiconductor film. Thereafter, by heating, the metal element or a silicide of the metal element is formed on a multipoint of a crystal grain.

Furthermore, according to the invention, as a method for forming a metal element or a silicide of the metal element on a multipoint of a crystalline semiconductor film, a metal element is added over an amorphous semiconductor film. Thereafter, the metal element or the silicide of the metal element is formed on a multipoint of a crystal grain as well as the amorphous semiconductor film is crystallized by irradiating thereover with laser light.

In the invention, a metal element promotes crystallization of an amorphous semiconductor film, and typically nickel (Ni), iron (Fe), cobalt (Co), platinum (Pt), titanium (Ti), palladium (Pd), or the like can be applied to.

In addition, in the invention, a probe of a Scanning Probe Microscope (SPM), a negative electrode material of a lithium battery, a gas occluding substance, a FET, and a semiconductor device having the FET can be manufactured by using the ultrafine carbon fiber.

It is possible to control a diameter of an ultrafine carbon fiber according to a method for manufacturing an ultrafine carbon fiber of the invention, so that an ultrafine carbon fiber having a uniform diameter can be formed. In addition, a field emission element that has an ultrafine carbon fiber whose diameter is uniform as an electron emission portion can be formed. Furthermore, density of an electron emission portion of a field emission element can be also controlled. Accordingly, it is possible to uniformly discharge an emission current per pixel; therefore, a FED that enabled a display without variation can be formed.

In addition, an ultrafine carbon fiber manufactured according to the invention has an uniform diameter; therefore, a probe of a Scanning Probe Microscope (SPM), a FET, a negative electrode material of a lithium battery, a gas occluding substance, or the like having high reliability can be manufactured.

In the invention, it is possible to manufacture a field emission element by using a large-sized substrate, which is suitable for a mass production process. Accordingly, an ultrafine carbon fiber, a semiconductor device, and a display device using an ultrafine carbon fiber can be manufactured by achieving high productivity.

DETAILED DESCRIPTION OF THE PREFERRED EMBODIMENTS

Figure 1A:
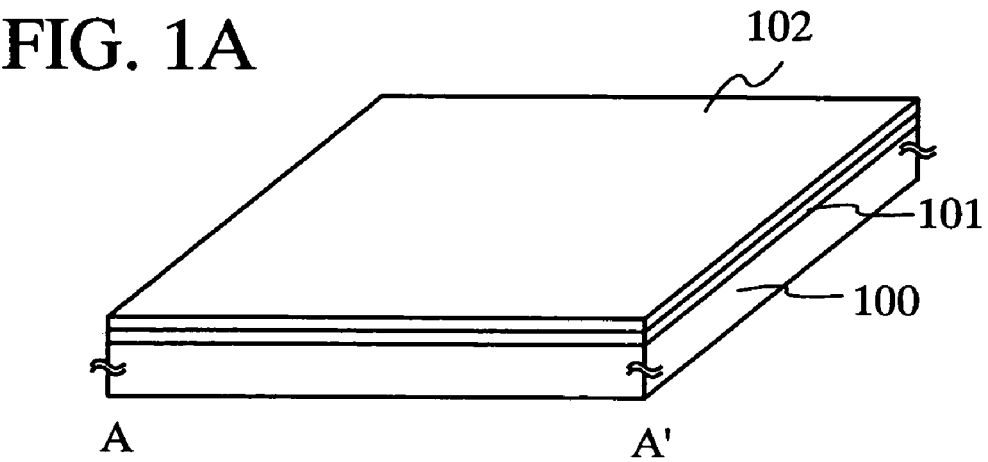
FIGS. 1A to 1C are perspective views showing a step of manufacturing an ultrafine carbon fiber according to the present invention.

Embodiments of the present invention will be described below with reference to the accompanying drawings. However, it is to be understood that various changes and modifications will be apparent to those skilled in the art. Therefore, the invention is not interpreted with limiting to the description in this embodiment. In addition, in all figures for describing the embodiments, the same reference numerals denote the same parts or parts having the same function and the explanation will not be repeated.

(Embodiment 1)

Figure 1B:
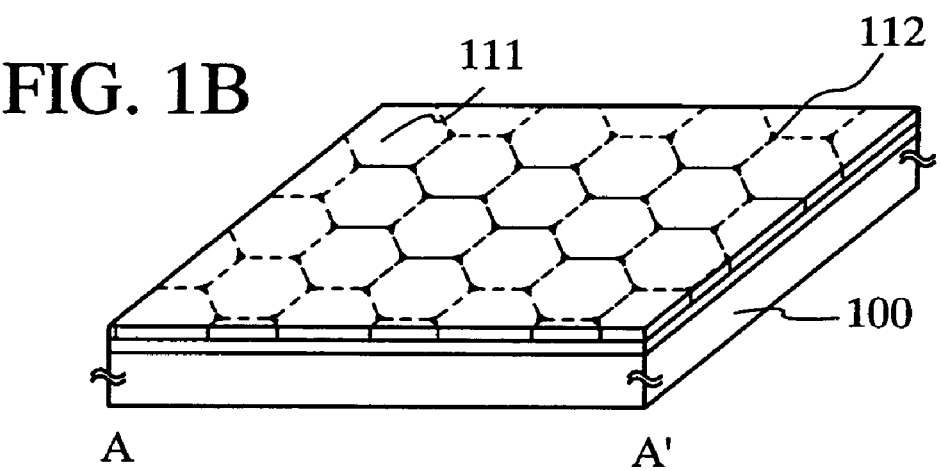
Figure 1C:
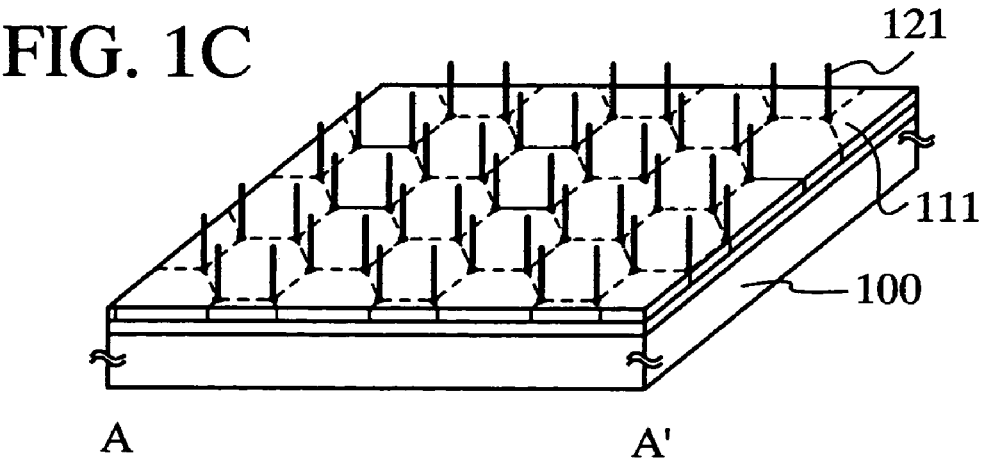
Figure 3A:
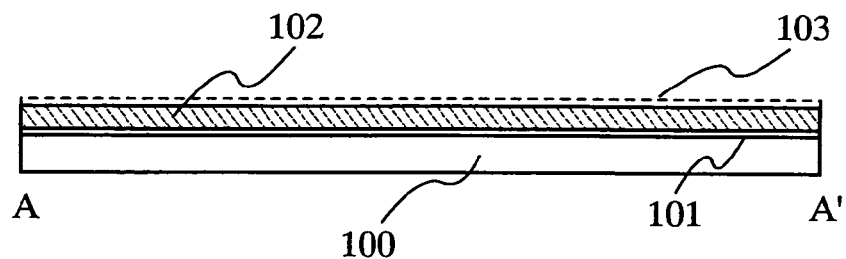
FIGS. 3A to 3C are cross-sectional views showing a step of manufacturing an ultrafine carbon fiber according to the invention.
Figure 3B:
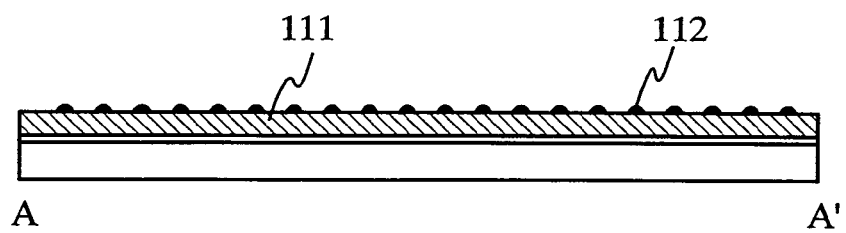
Figure 3C:
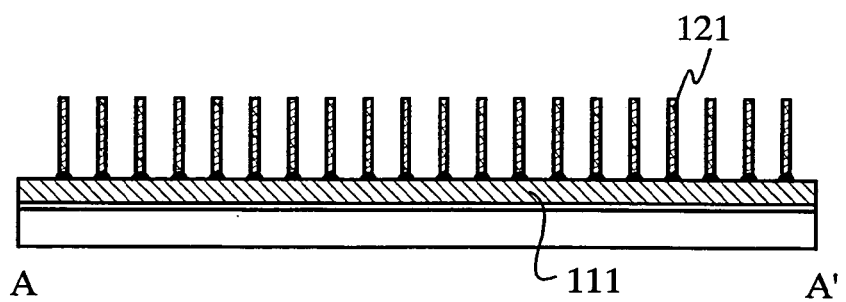

A method for manufacturing an ultrafine carbon fiber is described with reference to FIGS. 1A to 1C and 3A to 3C. FIGS. 1A to 1C are perspective views of substrate over which an amorphous semiconductor film and a crystalline semiconductor film are formed. FIGS. 3A to 3C are cross-sectional views taken along lines A–A' in FIGS. 1A to 1C.

As shown in FIGS. 1A and 3A, an amorphous semiconductor film 102 is formed over a substrate 100 by interposing a first insulating film 101 therebetween.

The first insulating film 101 is formed of a film mainly containing silicon and oxygen (a silicon oxide film, a silicon nitride oxide film, a silicon oxynitride film, and the like) by a known method (CVD (Chemical Vapor Deposition), PVD (Physical Vapor Deposition), or the like). The first insulating film 101 can prevent a trace of alkali metal such as sodium (Na) contained in a glass substrate from dispersing.

The amorphous semiconductor film 102 is formed on the first insulating film 101 by a known method (CVD, PVD, or the like). The amorphous semiconductor film 102 containing silicon is used, which is formed of a silicon film or silicon germanium ($Si_{1-x}Ge_x$ (0<x<1, typically x=from 0.001 to 0.05)). The film thickness of the amorphous semiconductor film 102 is preferably within a range of from 0.03 μm to 0.3 μm; however, it is not limited thereto.

As shown in FIG. 3A, a solution 103 containing from 1 ppm to 1000 ppm of a metal element that promotes crystallization is applied on the surface of the amorphous semiconductor film 102. Nickel (Ni), iron (Fe), cobalt (Co), platinum (Pt), titanium (Ti), palladium (Pd), or the like can be applied to the metal element.

As shown in FIGS. 1B and 3B, a crystalline semiconductor film 111 is formed by crystallizing the amorphous semiconductor film 102. A known method (laser crystallization, rapid thermal annealing (RTA), heat crystallization with using an annealing furnace, or the like) can be used for a crystallization method. Here, the amorphous semiconductor film 102 is crystallized by heat crystallization using an annealing furnace. The solution 103 containing the metal element that promotes crystallization is applied on the surface of the amorphous semiconductor film 102, so that crystallization is carried out at low temperature and in short time. Typically, the amorphous semiconductor film 102 is heated for from 1 minute to 12 hours at from 400° C. to 1100° C., preferably from 500° C. to 650° C. Through the crystallization step, a metal element or a silicide of the metal element 112 is precipitated (cohered or segregated) on a surface of a triple point of a crystal grain formed in a crystal grain boundary as well as the crystalline semiconductor film 111 is formed by crystallizing the amorphous semiconductor film 102. It is to be noted that density of a triple point of a crystal grain and a size thereof can be controlled depending on a crystallization condition such as crystallization temperature, a hydrogen concentration in a film, the amount of a metal element that promotes crystallization, and the like. That is, density of a metal element or the a silicide of a metal element 112 formed on a surface of the triple point of the crystal grain and the area thereof can be controlled by controlling the triple point of the crystal grain. As a result, density of an ultrafine carbon fiber formed by using the metal element or the silicide of the metal element 112 as a core and the diameter thereof can be controlled.

Next, as shown in FIGS. 1C and 3C, an ultrafine carbon fiber 121 is formed by using the metal element or the silicide of the metal element 112 formed on the surface of the triple point of the crystal grain as a catalyst. The ultrafine carbon fiber 121 are formed by being heated at from 100° C. to 1100° C., preferably from 400° C. to 650° C. in an atmosphere containing hydrocarbon such as methane or acetylene, in which pressure of the atmosphere is reduced to from 1 torr to 760 torr. In addition, the ultrafine carbon fiber can be formed by CVD at from 1 torr to 760 torr using hydrocarbon such as methane or acetylene as a raw material. In this case, negative voltage may be applied to the substrate side.

Thereafter, the ultrafine carbon fiber 121 is dissociated from the crystalline semiconductor film 111 by a lift-off method, or the like, so that an ultrafine carbon fiber can be formed.

Figure 2:
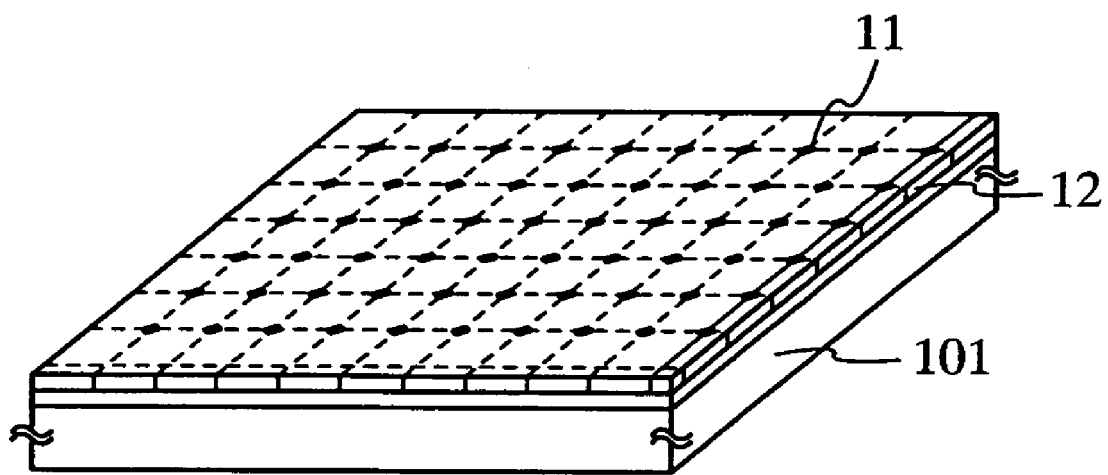
FIG. 2 is a cross-sectional view showing a crystalline semiconductor film according to the invention.

Here, the crystalline semiconductor film having a triple point formed on a crystal grain boundary is shown as a crystalline semiconductor film; however, it is not limited thereto. As shown in FIG. 2, a crystalline semiconductor film 12 having quadruple point 11 formed on a crystal grain boundary or a crystalline semiconductor film having much more multipoint may be formed. Note that a metal element or a silicide of the metal element is formed on the quadruple point or the multipoint even in the case of the crystalline semiconductor film.

(Embodiment 2)

Next, a method for manufacturing an ultrafine carbon fiber of the present invention, which is different from the above, is described with reference to FIGS. 1A to 1C and 4A to 4D.

As well as FIGS. 3A to 3C, FIGS. 4A to 4D are cross-sectional views taken along lines A–A' in FIGS. 1A to 1C. As well as Embodiment 1, a first insulating film 101 and an amorphous semiconductor film 102 are sequentially formed over a substrate 100. Then, this amorphous semiconductor film 102 is crystallized. In this embodiment, laser crystallization is used for a crystallization method. The amorphous semiconductor film 102 is irradiated with laser light 104 using a gas laser oscillator, a solid laser oscillator, or a metal oscillator to form a crystalline semiconductor film 131. Continuous-wave or pulsed laser light can be used for the laser light 104 at this time.

Figure 4A:
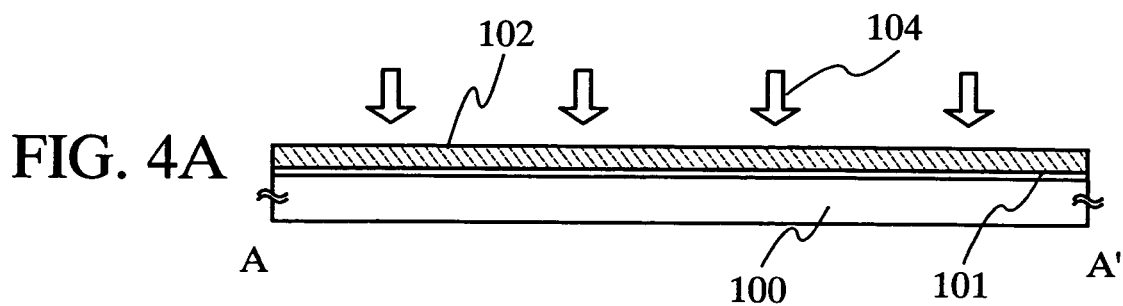
FIGS. 4A to 4D are cross-sectional views showing a step of manufacturing an ultrafine carbon fiber according to the invention.
Figure 4B:
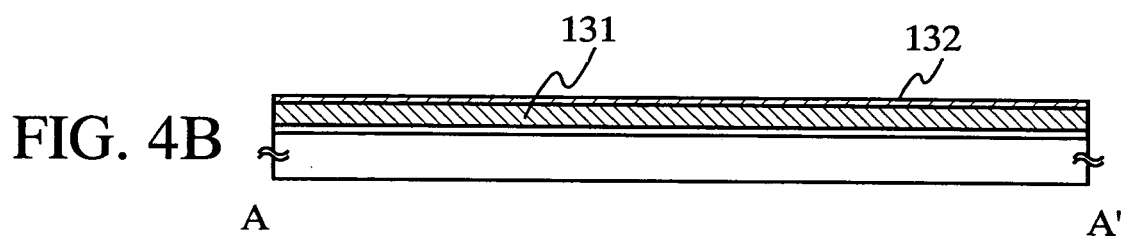

As shown in FIG. 4B, a thin film 132 having a metal element is formed on the crystalline semiconductor film 131 by a known method (CVD, PVD, or the like). Nickel (Ni), iron (Fe), cobalt (Co), platinum (Pt), titanium (Ti), palladium (Pd), or the like can be used for the metal element. Here, the metal thin film with a film thickness of from 2 nm to 5 nm is formed by sputtering. In place of the step, it is also possible to apply a solution containing the metal element on the crystalline semiconductor film 131.

Figure 4C:
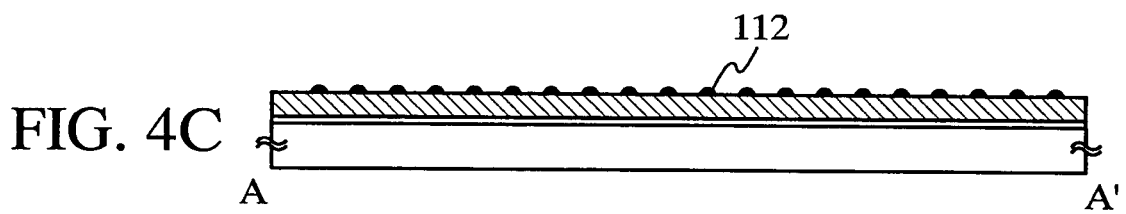
Figure 12:
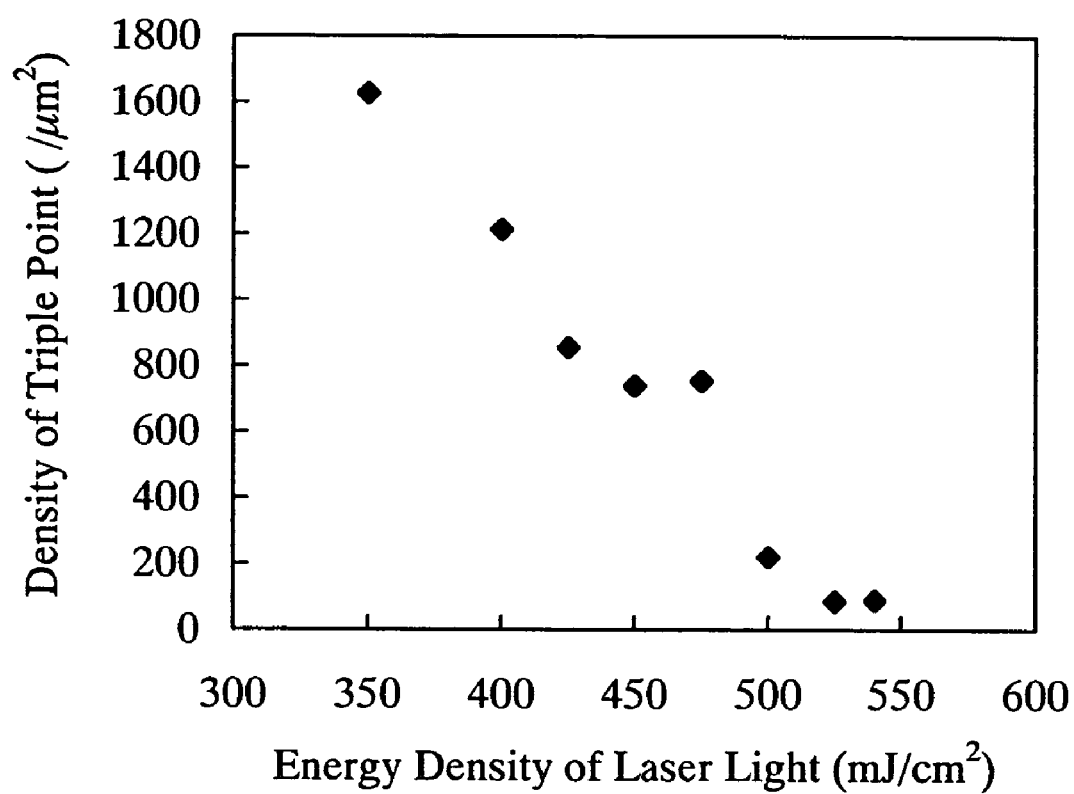
FIG. 12 is a diagram showing density of a triple point.

Then, as shown in FIGS. 1B and 4C, the thin film 132 is heated typically at from 100° C. to 1100° C., preferably from 400° C. to 600° C. for from 1 hour to 5 hours. A metal element or a silicide of the metal element 112 is precipitated (cohered or segregated) on a surface of a triple point of a crystal grain formed in a crystal grain boundary of the crystalline semiconductor film 131. As shown in FIG. 12, the triple point of the crystal grain of the crystalline semiconductor film formed using laser light differs depending on a condition of laser irradiation. FIG. 12 shows density of a triple point when an amorphous silicon film with a film thickness of 50 nm is irradiated with a XeCl laser. It can be understood that density of the triple point differs depending on an energy density of laser light and the number of shots. By controlling the energy density and the number of shots, density of the triple point and density of a metal element or a silicide of a metal element formed thereon can be controlled. In addition, a size of a metal element or a silicide of a metal element cohered on a triple point can be controlled by a film thickness of the metal thin film formed on a crystalline semiconductor film or by concentration of a solution containing the metal element. That is, density of an ultrafine carbon fiber formed by using the metal element or the silicide of the metal element as a core and the diameter thereof can be controlled.

Before forming the thin film 132 containing the metal element, the surface of the crystalline semiconductor film 131 may be hydrogenated. Through this step, a size of the metal element or the silicide of the metal element formed on the triple point can be diminished much more.

Figure 4D:
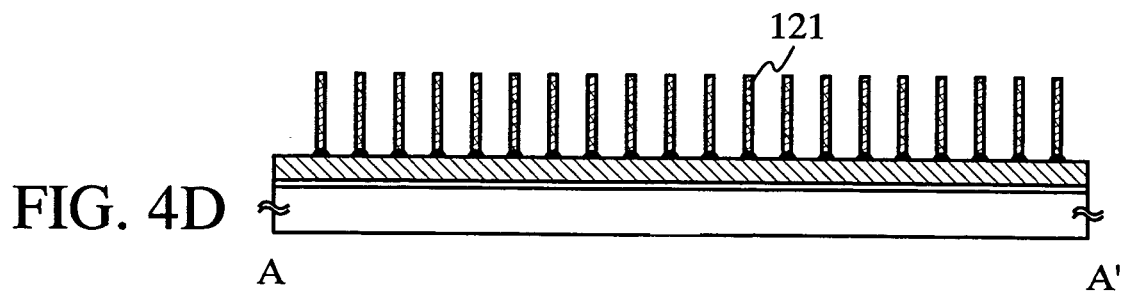

Next, as shown in FIGS. 1C and 4D, an ultrafine carbon fiber 121 is formed by using the metal element or the silicide of the metal element 112 as a catalyst. The ultrafine carbon fiber 121 is formed by being heated at from 100° C. to 1100° C., preferably from 400° C. to 650° C. in an atmosphere containing hydrocarbon such as methane or acetylene, in which pressure of the atmosphere is reduced to from 1 torr to 760 torr. In addition, the ultrafine carbon fiber 121 can be formed by CVD at from 1 torr to 760 torr using hydrocarbon such as methane or acetylene as a raw material. In this case, negative voltage may be applied to the substrate side.

Thereafter, the ultrafine carbon fiber 121 is dissociated from the crystalline semiconductor film 131 by a lift-off method, so that a ultrafine carbon fiber can be formed.

(Embodiment 3)

Next, a method for manufacturing an ultrafine carbon fiber of the present invention, which is different from the above, is described.

As well as FIGS. 3A to 3C and 4A to 4D, FIGS. 5A to 5C are cross-sectional views taken along lines A–A' in FIGS. 1A to 1C. As well as Embodiment 1, a first insulating film 101 and an amorphous semiconductor film 102 are sequentially formed over a substrate 100.

Figure 5A:
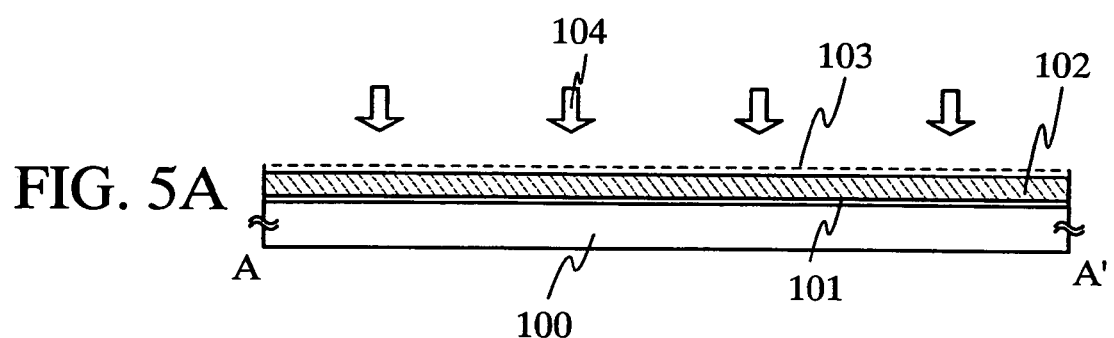
FIGS. 5A to 5C are cross-sectional views showing a step of manufacturing an ultrafine carbon fiber according to the invention.
Figure 5B:
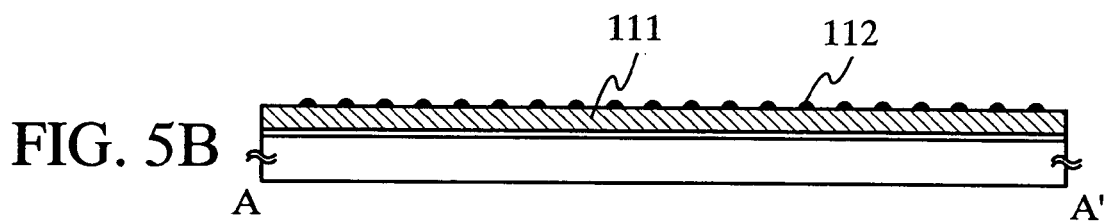

Next, as shown in FIG. 5A, a solution 103 containing from 1 ppm to 1000 ppm of a metal element is applied on the surface of the amorphous semiconductor film 102. Nickel (Ni), iron (Fe), cobalt (Co), platinum (Pt), titanium (Ti), palladium (Pd), or the like can be applied to the metal element.

Then, the amorphous semiconductor film 102 is crystallized. Here, laser crystallization is used for a crystallization method. The amorphous semiconductor film 102 is irradiated with laser light 104 using a gas laser oscillator, a solid laser oscillator, or a metal oscillator to form a crystalline semiconductor film 111. In addition, a metal element or a silicide of the metal element 112 is precipitated (cohered or segregated) on a surface of a triple point of a crystal grain of the crystalline semiconductor film. Continuous-wave or pulsed laser light can be used for the laser light 104 at this time (FIG. 5A).

Density of a a triple point of a crystal grain and a size thereof can be controlled depending on a crystallization condition such as an energy density of laser light, the number of shots, a hydrogen concentration in a film, the amount of a metal element that promotes crystallization, and the like. That is, density of a metal element or a silicide of the metal element formed on a surface of a triple point of a crystal grain and the area thereof can be controlled by controlling the triple point of the crystal grain. Thus, density of an ultrafine carbon fiber formed by using the metal element or the silicide of the metal element 112 as a core and the diameter thereof can be controlled.

Figure 5C:
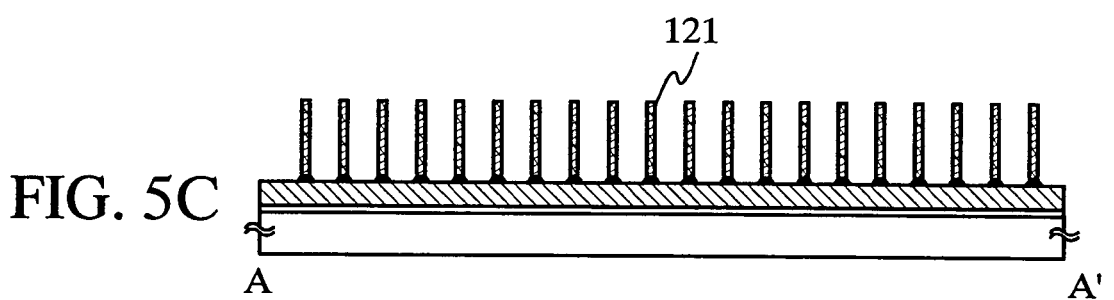

Next, as shown in FIGS. 1C and 5C, an ultrafine carbon fiber 121 is formed by using the metal element or the silicide of the metal element 112 as a catalyst. The ultrafine carbon fiber 121 is formed by being heated at from 100° C. to 1100° C., preferably from 400° C. to 650° C. in an atmosphere containing hydrocarbon such as methane or acetylene, in which pressure of the atmosphere is reduced to from 1 torr to 760 torr. In addition, the ultrafine carbon fiber 121 can be formed by CVD at from 1 torr to 760 torr using hydrocarbon such as methane or acetylene as a raw material. In this case, negative voltage may be applied to the substrate side.

Thereafter, the ultrafine carbon fiber 121 is dissociated from the crystalline semiconductor film 111 by a lift-off method, so that an ultrafine carbon fiber 121 can be formed.

(Embodiment 4)

Here, a field emission element, a structure of a display device comprising the field emission element, and the manufacturing method thereof are described. A field emission element of the present invention is composed of a cathode electrode and an electron emission portion formed on the surface thereof. The cathode electrode is formed of a crystalline semiconductor film and an ultrafine carbon fiber such as a graphite nanofiber, a carbon nanofiber, a carbon nanotube, tubular graphite, a carbon nanocone having a thin and sharp edge, or corn shape graphite can be applied to the electron emission portion.

In this embodiment, a field emission element of a diode-type FED, a display device having the field emission element, and the manufacturing method thereof are described. Specifically, a field emission display device having an electron emission portion formed of an ultrafine carbon fiber in a region where a stripe cathode electrode formed over a first substrate and a stripe anode electrode formed over a second substrate are intersected is described with reference to FIGS. 6 and 7A to 7C. Here, the step of manufacturing the ultrafine carbon fiber in Embodiment 2 is applied to a step of manufacturing an electron emission portion. The manufacturing step shown in Embodiments 1 or 3 may be applied in place of this step.

Figure 6:
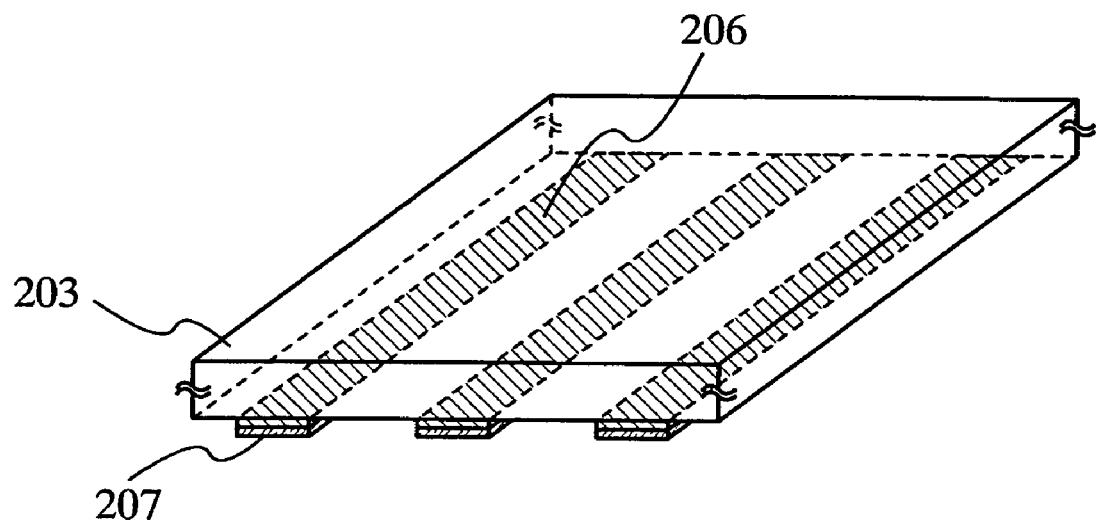
FIG. 6 is a perspective view showing a display panel of a field emission display device according to the invention.
Figure 6:
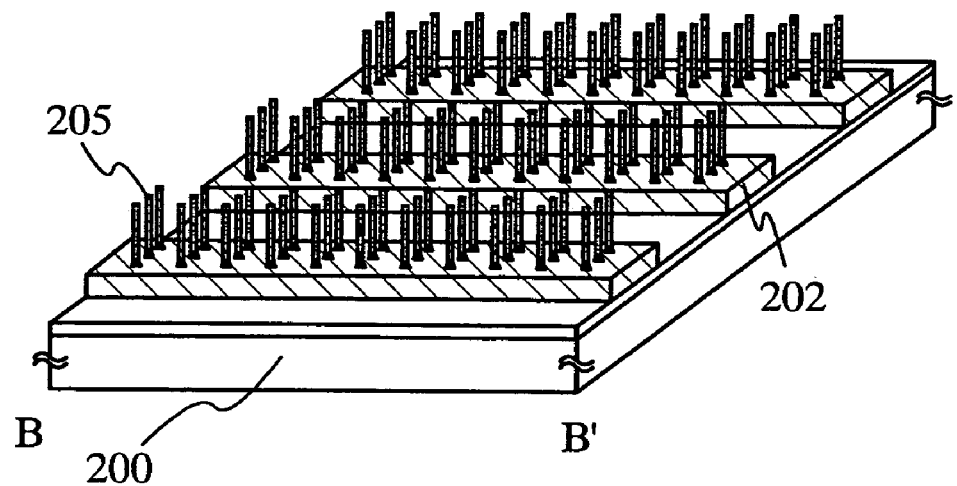

FIG. 6 is a perspective view of a part of a display panel. A stripe cathode electrode 202 formed of a crystalline semiconductor film is formed over a first substrate 200 and an electron emission portion 205 formed of an ultrafine carbon fiber is formed thereover. On the other hand, a stripe anode electrode 207 and a fluorescent layer 206 are formed over a second substrate 203. An electric field is applied to a region in which the cathode electrode 202 of the first substrate 200 and the anode electrode 207 of the second substrate 203 are intersected with a predetermined space, and an electron is emitted from the electron emission portion 205 on the cathode electrode 202 to the anode electrode 207.

Figure 7A:
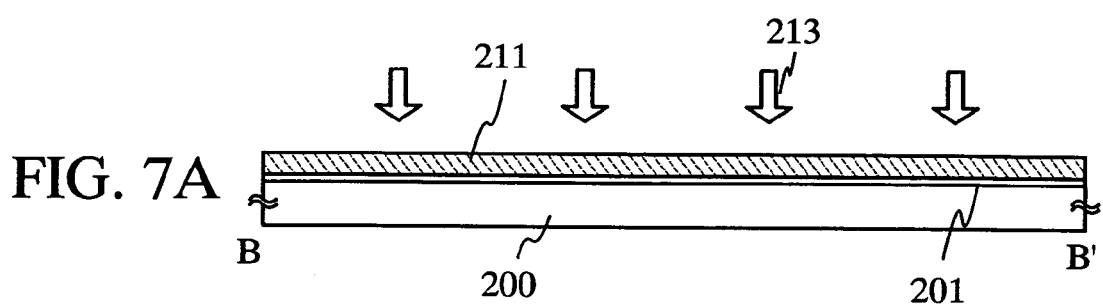
FIGS. 7A to 7C are cross-sectional views showing a step of manufacturing a field emission element according to the invention.
Figure 7B:
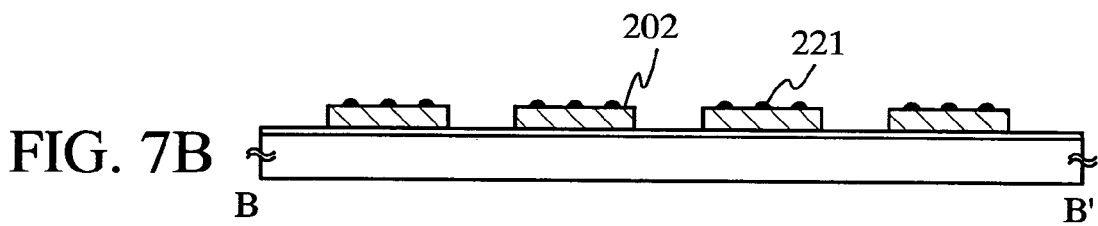
Figure 7C:
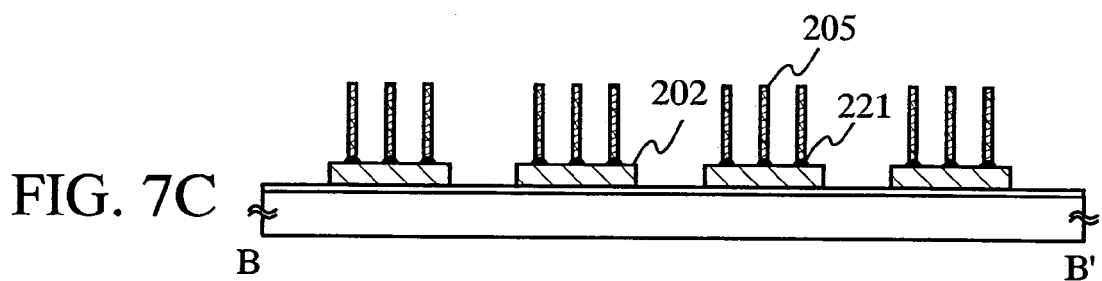

FIGS. 7A to 7C are cross-sectional views taken along a line B–B' in FIG. 6. A method for manufacturing a cathode electrode and an electron emission portion is described with reference to FIGS. 7A to 7C. The same parts as FIG. 6 are shown in the same reference numerals.

As shown in FIG. 7A, a first insulating film 201 is formed on a first substrate 200 and an amorphous semiconductor film 211 is formed by a known method (CVD, PVD, or the like). Thereafter, the amorphous semiconductor film 211 is irradiated with laser light 213 using a gas laser oscillator, a solid laser oscillator, or a metal oscillator to form a crystalline semiconductor film. Continuous-wave or pulsed laser light can be used for the laser light 213 at this time.

Next, as shown in FIG. 7B, a cathode electrode 202 formed of a stripe crystalline semiconductor film by etching the crystalline semiconductor film is formed. Then, a thin film containing a metal element is formed on the cathode electrode 202 formed of the crystalline semiconductor films by a know method (CVD, PVD, or the like). Nickel (Ni), iron (Fe), cobalt (Co), platinum (Pt), titanium (Ti), palladium (Pd), or the like can be applied to the metal element. Here, the metal thin film with a film thickness of from 2 nm to 5 nm is formed by sputtering.

Then, a metal element contained in the metal thin film is segregated on a surface of a triple point of a crystal grain in a crystal grain boundary of the crystalline semiconductor film by heating the thin film containing the metal element at from 100° C. to 1100° C., preferably from 400° C. to 600° C. for from 1 hour to 5 hours to form a region 221. Thereafter, the metal thin film formed between the cathode electrode 202 is removed.

Note that the surface of the crystalline semiconductor film may be hydrogenated before forming the thin film containing the metal element. Through this step, a size of a metal element or a silicide of a metal element formed on a triple point can be diminished much more.

Next, as shown in FIG. 7C, an electron emission portion 205 formed of an ultrafine carbon fiber by using the metal element or the silicide of the metal element (the region 221) as a catalyst is formed. Here, the electron emission portion 205 is formed by being heated at from 100° C. to 1100° C., preferably from 400° C. to 650° C. in an atmosphere containing hydrocarbon such as methane or acetylene, in which pressure of the atmosphere is reduced to from 1 torr to 760 torr. In addition, the electron emission portion 205 can be formed by CVD at from 1 torr to 760 torr using hydrocarbon such as methane or acetylene as a raw material. In this case, negative voltage may be applied to the substrate side. Through the manufacturing step of the electron emission portion in this embodiment, the diameter and the density of the electron emission portion 205 can be controlled; therefore, it is possible to form a substrate of a FED, which is possible to uniformly discharge an emission current per pixel.

It is preferable that an impurity element imparting n-type conductivity is added to the cathode electrode 202 formed of the crystalline semiconductor film to increase conductivity.

An element belonging to Group 15, typically phosphorus (P) or arsenic (As) can be used for the impurity element imparting n-type conductivity.

Then, as shown in FIG. 6, the fluorescent layer 206 is formed over the second substrate 203 by a known method, a conductive film is formed thereover in a film thickness of from 0.05 μm to 0.1 μm, and then the stripe anode electrode 207 is formed. A thin film composed of a mental element such as aluminum, nickel, or silver or a transparent conductive film such as ITO (indium tin oxide), indium oxide-zinc oxide alloy ($In_2O_3$)—ZnO), or zinc oxide (ZnO) can be formed by a known method and patterned by a known method to form the conductive film.

Fluorescent layers 206 are composed of a red fluorescent layer, a blue fluorescent layer, and a green fluorescent layer, and one pixel is composed of one set thereof. A black matrix may be formed between each fluorescent layer to enhance the contrast. The anode electrode 207 may be formed over each fluorescent layer, or may be formed over a pixel composed of a red fluorescent layer, a blue fluorescent layer, and a green fluorescent layer.

A field emission display panel is formed by sealing the first substrate 200 and the second substrate 203 formed through the above steps with an adhesive member and by depressurizing a portion surrounded with the substrates and the adhesive member.

A passive driving method is applied to the field emission display device here. In FIG. 6, the cathode electrode 202 formed over the first substrate 200 is connected to a cathode electrode driver circuit, and the anode electrode 207 formed over the second substrate 203 is connected to an anode electrode driver circuit. Negative voltage is relatively applied to the cathode electrode 202 from the cathode electrode driver circuit and positive voltage is relatively applied to the anode electrode 207 from the anode electrode driver circuit. Depending on an electric field generated by applying the voltage, an electron is emitted from an edge of the electron emission portion 205 according to a quantum tunneling effect, which is induced to the anode electrode 207. The electron collides with the fluorescent layer 206 formed under the anode electrode 207, so that a display can be obtained by exciting the fluorescent layer 206 to emit light. Note that the cathode electrode driver circuit and the anode electrode driver circuit can be formed at an extended portion over the first substrate 200. In addition, an external circuit such as an IC chip can be also used. Through the above steps, the field emission display device can be formed.

Through the above steps, a field emission element having a cathode electrode and an electron emission portion formed of an ultrafine carbon fiber on the surface thereof and a display device having the field emission element are formed. Although the stripe cathode electrode is used here, a planar cathode electrode and a planar anode electrode can be used for an area color display device.

(Embodiment 5)

Next, a structure of a field emission element of a triode-type FED and a field emission display device having the same, and the method thereof are described with reference to FIGS. 8 and 9A to 9E. Here, the field emission element includes 1) a cathode electrode formed of a semiconductor film etched in stripe and having n-type conductivity, 2) a gate electrode opposed to the cathode electrode with interposing an interlayer insulating film therebetween, 3) an electron emission portion which is an opening of the gate electrode and the insulating film and which is formed of an ultrafine carbon fiber on the surface of the cathode electrode.

Note that the steps of forming the ultrafine carbon fiber described by using Embodiment 2 are applied to a step of the electron emission portion here. The steps using Embodiment 1 or Embodiment 3 may be applied in place of the step.

Figure 8:
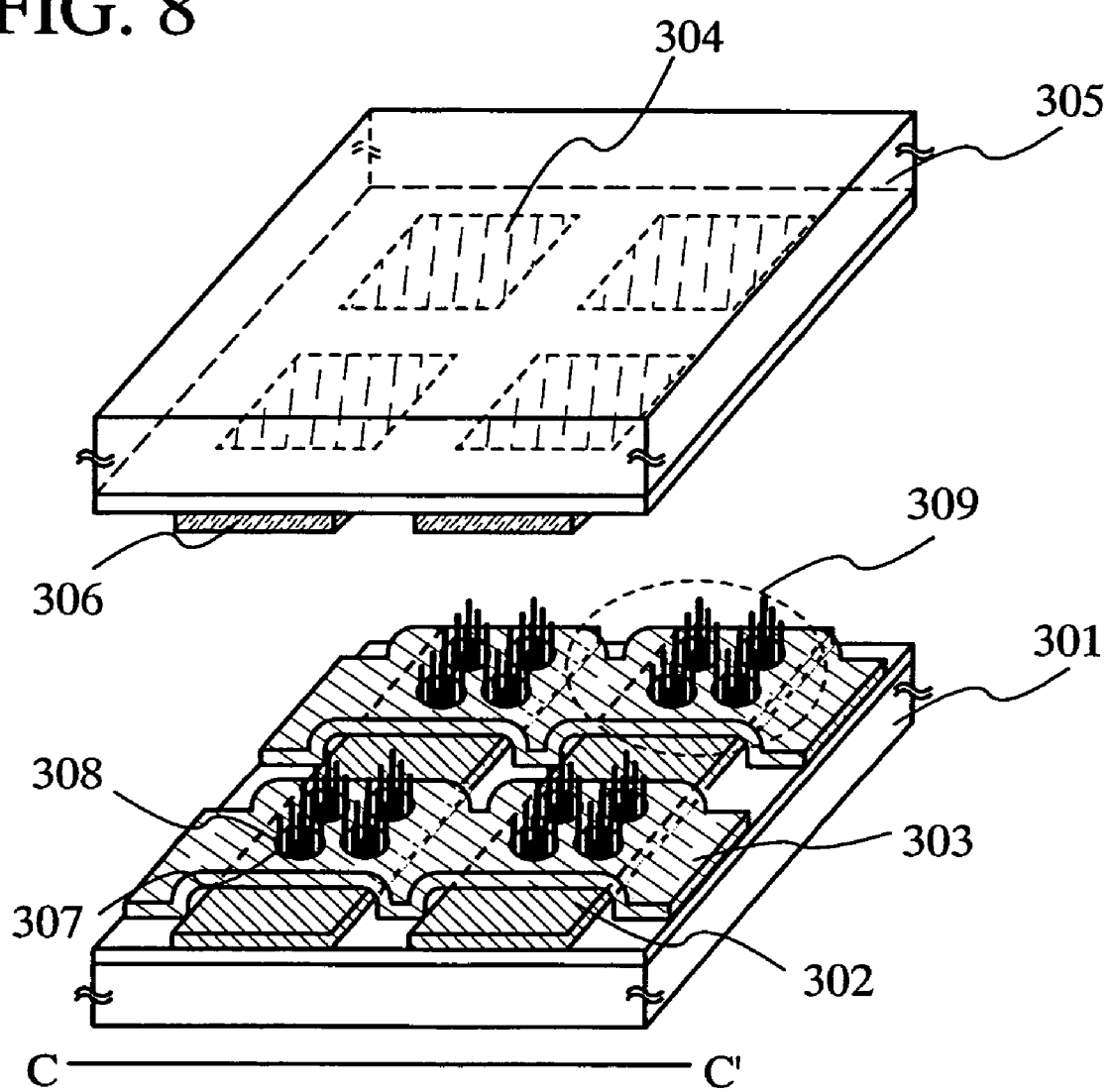
FIG. 8 is a perspective view showing a display panel of a field emission display device according to the invention.

FIG. 8 is a perspective view of a display panel. A stripe cathode electrode 302 formed of a semiconductor film and a stripe gate electrode 303 by interposing an insulating film therebetween are formed over a first substrate 301. The cathode electrode 302 and the gate electrode 303 are orthogonal to the insulating film therebetween. An opening 307 is formed at an intersection of the cathode electrode 302 and the gate electrode 303, and electron emission portion 308 formed of ultrafine carbon fiber is formed on the surface of the cathode electrode 302 in the opening 307. A fluorescent layer 304 and an anode electrode 306 are formed over a second substrate 305.

FIGS. 9A to 9E are cross-sectional views taken along a line C–C' in FIG. 8. A method for manufacturing a field emission element is described with reference to FIGS. 9A to 9E.

Figure 9A:
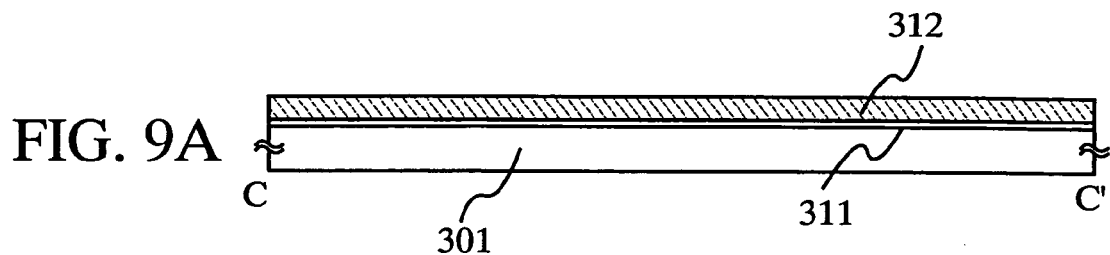
FIGS. 9A to 9E are cross-sectional views showing a step of manufacturing a field emission element according to the invention.

As shown in FIG. 9A, a first insulating film 311 is formed over a first substrate 301 and an amorphous semiconductor film is formed thereover. Then, a crystalline semiconductor film 312 is formed by irradiating the amorphous semiconductor film with laser light.

Figure 9B:
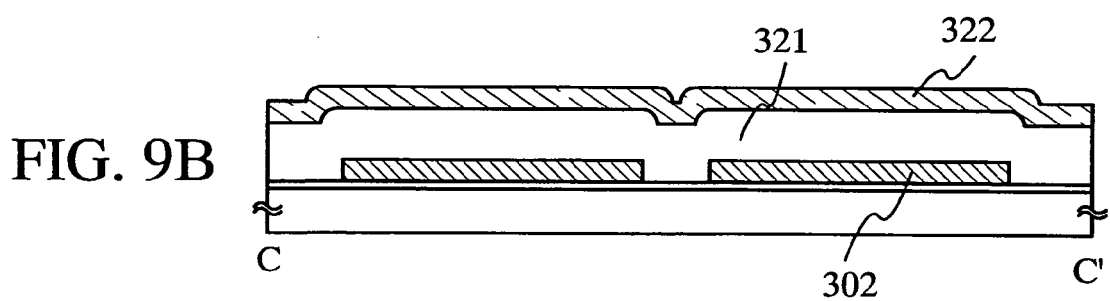

Thereafter, as shown in FIG. 9B, a resist mask is formed at portion where a cathode electrode is formed, and then the exposed crystalline semiconductor film is etched to form a cathode electrode 302 formed of a stripe crystalline semiconductor film.

Then, a second insulating film 321 is formed on the cathode electrode 302 formed of the crystalline semiconductor film. A film mainly containing silicon and oxygen (a silicon oxide film, a silicon nitride oxide film, a silicon oxynitride film, or the like) formed by a known method (CVD, PVD, or the like) or an organic resin film formed by an application method is used for the second insulating film 321.

Next, an impurity element imparting n-type conductivity is added to the cathode electrode 302 formed of the crystalline semiconductor film to increase first conductivity. An element belonging to Group 15, typically phosphorus (P) or arsenic (As) can be used for the impurity element imparting n-type conductivity. A step of adding an n-type impurity may be carried out before forming the second insulating film 321.

Then, a first conductive film 322 is formed. A metal such as tungsten (W), niobium (Nb), tantalum (Ta), a molybdenum (Mo), chromium (Cr), aluminum (Al), or copper (Cu) or an alloy containing the metal element or a compound thereof (nitride such as titanium nitride or tantalum nitride, silicide such as tungsten silicide, titanium silicide, or manganese silicide, a transparent conductive film such as ITO or IZO, or the like) can be used for the first conductive film 322. A stripe gate electrode is formed by forming a resist mask on the first conductive film 322 and patterning it and by removing the unnecessary part.

Figure 9C:
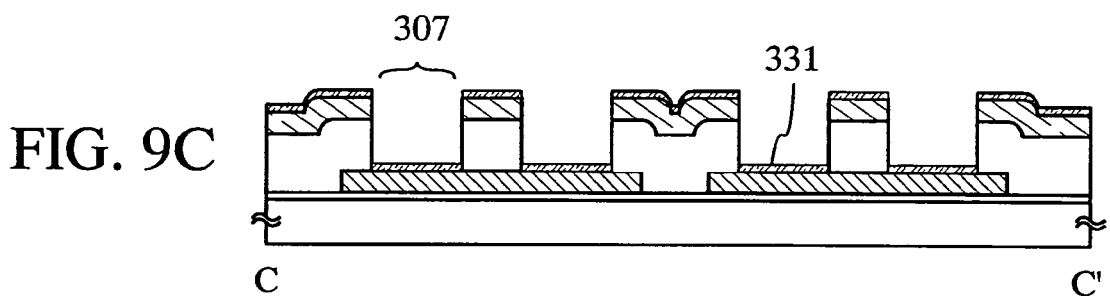

Next, as shown in FIG. 9C, in a region where the cathode electrode 302 and the gate electrode intersect by interposing the second insulating film 321 therebetween, the resist mask is formed and patterned into a desired shape. Thereafter, an opening 307 is formed by etching the gate electrode and the second insulating film 321 into an arbitrary shape.

Figure 9D:
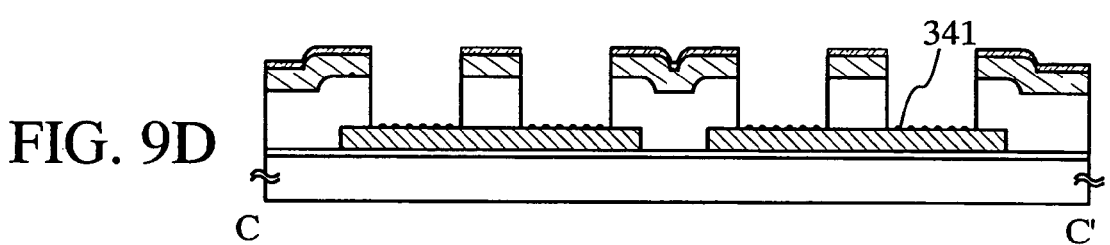

Then, a thin film 331 containing a metal element formed from nickel (Ni), cobalt (Co), platinum (Pt), iron (Fe), titanium (Ti), or palladium (Pd) with a film thickness of from 2 nm to 5 nm is formed on the surface of the crystalline semiconductor film by a known method (CVD, sputtering, vacuum vapor deposition, or the like). Thereafter, the metal thin film 331 is heated at from 100° C. to 1100° C., preferably from 400° C. to 600° C. for from 1 hour to 5 hours, and a metal element or a silicide of the metal element 341 is precipitated on a triple point of a crystal grain formed in a crystal grain boundary.(FIG. 9D).

Figure 9E:
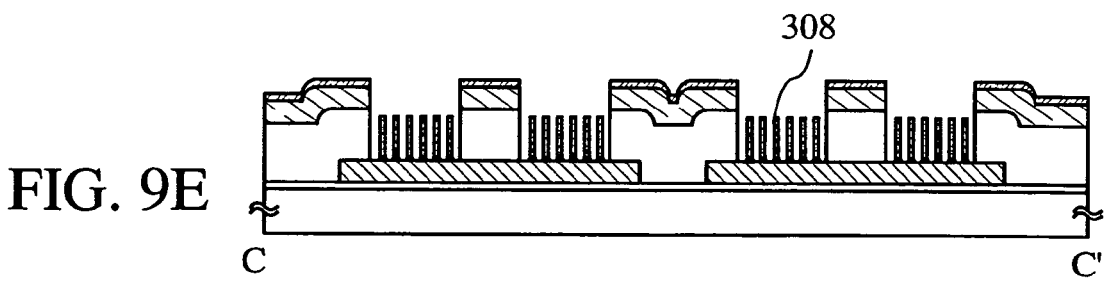

Next, as shown in FIG. 9E, an electron emission portion 308 formed of ultrafine carbon fiber by using the metal element or the silicide of the metal element as a catalyst is formed. The ultrafine carbon fiber is formed by being heated at from 100° C. to 1100° C., preferably from 400° C. to 650° C. in an atmosphere containing hydrocarbon such as methane or acetylene, in which pressure of the atmosphere is reduced to from 1 torr to 760 torr. In addition, the ultrafine carbon fiber can be formed by CVD at from 1 to torr 760 torr using hydrocarbon such as methane or acetylene as a raw material. In this case, negative voltage may be applied to the substrate side.

Note that the surface of the crystalline semiconductor film may be hydrogenated before forming the thin film containing the metal element. Through this step, a size of the metal element or the silicide of the metal element formed on a triple point can be diminished much more. Through the manufacturing step of the electron emission portion in this embodiment, the diameter and the density of the electron emission portion 308 can be controlled; therefore, it is possible to form a substrate of a FED, which is possible to uniformly discharge an emission current per pixel.

In addition, in FIG. 8, at an intersection 309 of the cathode electrode 302 and the gate electrode 303, the opening of 2×2 are described; however, it is not limited thereto, and one opening or a plurality of openings may be formed.

Through the above steps, a substrate having a field emission element formed of an ultrafine carbon fiber can be formed.

In FIG. 8, the first insulating film 311 and the second insulating film 321 shown in FIGS. 9A to 9E are omitted.

As shown in FIG. 8, the fluorescent layer 304 is formed over the second substrate 305 by a known method and a third conductive film is formed thereon in a film thickness of from 0.05 μm to 0.1 μm, which is etched into a desired shape (in a stripe or in a matrix) to form the anode electrode 306. The fluorescent layer 304 can be formed of the same material and structure as the fluorescent layer 206 shown in FIG. 6. In addition, the anode electrode 306 can be formed of the same material and structure as the anode electrode 207 shown in FIG. 6.

The first substrate 301 and the second substrate 305 formed through the above steps are sealed with an adhesive member, and a part surrounded with the substrates and the adhesive member is depressurized to form a display panel of a field emission display device.

A passive driving method is applied to the field emission display device formed in the above steps. As shown in FIG. 8, the cathode electrode 302 is connected to a cathode electrode driver circuit, the gate electrode 303 is connected to a gate electrode device circuit, and the anode electrode 306 is connected to an anode electrode driver circuit. Negative voltage (for example, 0 kV) is relatively applied to the cathode electrode 302 from the cathode electrode driver circuit, and positive voltage (for example, 50 V) is relatively applied to the gate electrode 303 from the gate electrode driver circuit. Depending on an electric field generated by applying the voltage, an electron is emitted from an edge of the electron emission portion 308 according to a quantum tunneling effect. Through the anode electrode driver circuit, higher voltage (for example, 1 kV) than positive voltage applied to the gate electrode 303 is applied to the anode electrode 306, so that the electron emitted from the field emission element is induced to the fluorescent layer 304 formed under the anode electrode 306. The electron collides with the fluorescent layer 304; therefore, a display can be obtained by exciting the fluorescent layer 304 and to emit light. Note that the cathode electrode driver circuit and the gate electrode driver circuit can be also formed over the first substrate 301 at the same time as the field emission element is formed. In addition, an external circuit such as an IC chip can be also used.

Through the above steps, the field emission display device can be formed.

(Embodiment 6)

Next, a field emission element of a triode-type FED is described with reference to FIGS. 10 and 11A to 11D. Here, the field emission element includes 1) a semiconductor region having a source region and a drain region, which is etched into a desired shape, 2) a source wiring and a source electrode which is in contact with the source region of the semiconductor region, 3) a gate electrode and a gate wiring that oppose to the semiconductor film through an interlayer insulating film and that control carrier concentration between the source region and the drain region of the semiconductor film, 4) an electron emission portion that is an opening of the gate electrode and the insulating film, and which is formed of ultrafine carbon fiber on the surface of the drain region of the semiconductor region.

A fluorescent layer 406 and an anode electrode 407 are formed over a second substrate 405.

Figure 10:
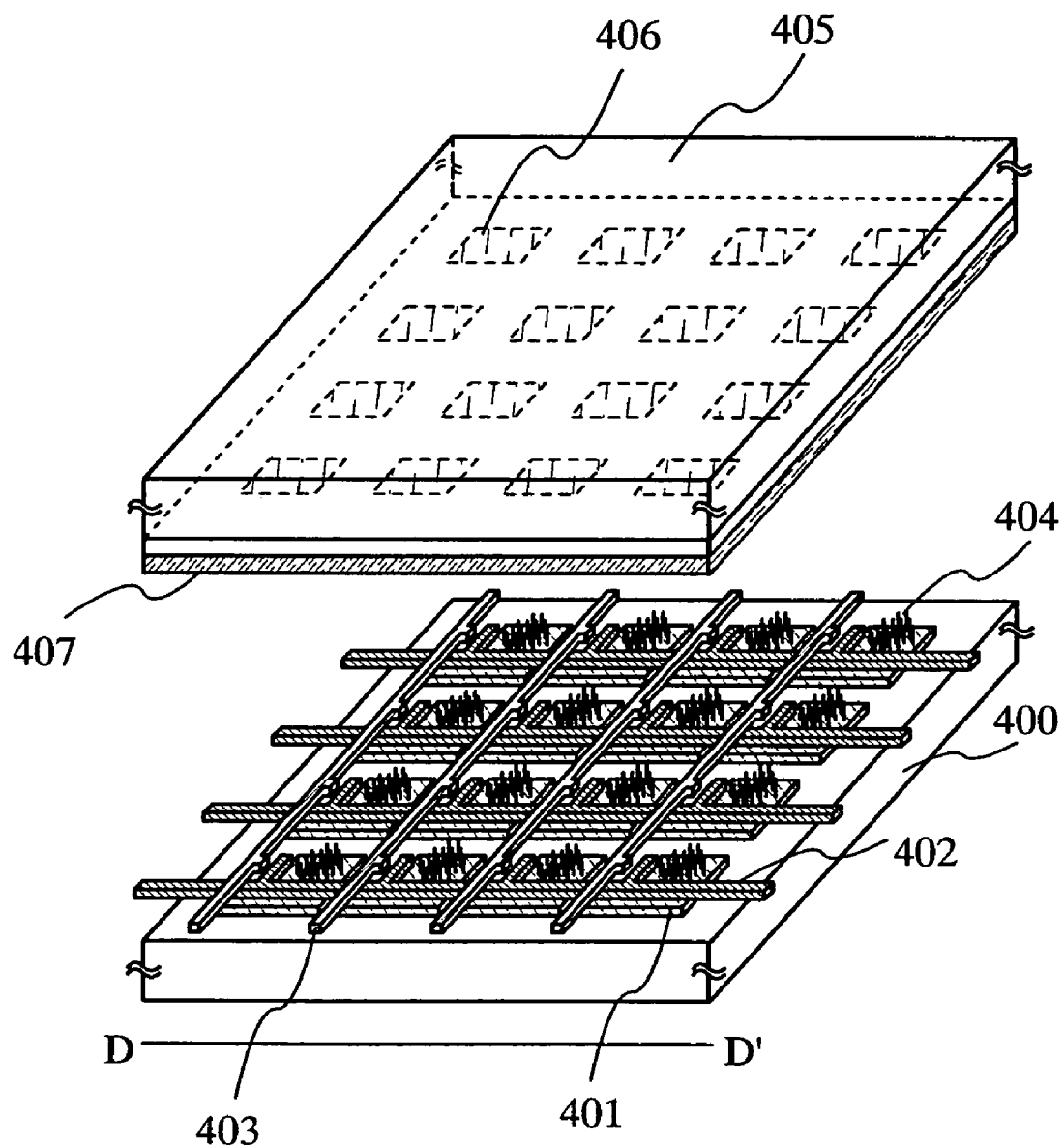
FIG. 10 is a perspective view showing a display panel of a field emission display device according to the invention.

FIGS. 11A to 11D are cross-sectional views taken along a line D–D' in FIG. 10. A method for manufacturing a field emission element of this embodiment is described with reference to FIGS. 11A to 11D.

Figure 11A:
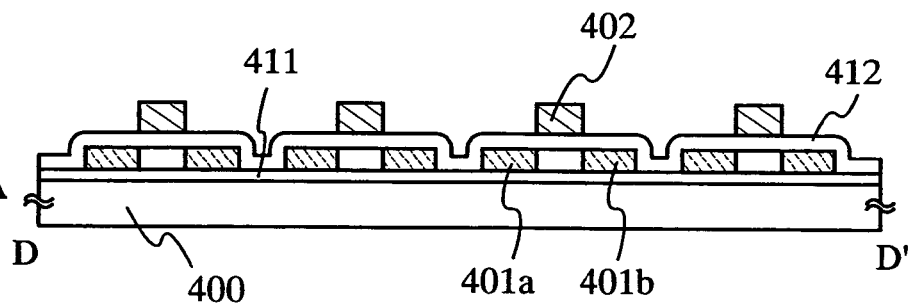
FIGS. 11A to 11D are cross-sectional views showing a step of manufacturing a field emission element according to the invention.

As shown in FIG. 11A, a first insulating film 411 is formed on a first substrate 400. Then, a crystalline semiconductor film is formed by a known method described in FIGS. 3A to 3C, a part of which is etched to form a semiconductor region (a region 401 of FIG. 10) having a desired shape.

Then, a second insulating film 412 is formed over the first substrate 400 by a known method. The second insulating film 412 is formed of a film mainly containing silicon and oxygen (a silicon oxide film, a silicon nitride oxide film, a silicon oxynitride film, or the like).

Next, a first conductive film is formed. The first conductive film is formed of the same material as the first conductive film 322 of FIGS. 9A to 9E. Then, a resist mask is formed on the first conductive film and is patterned and then the unnecessary part is removed to form a gate electrode and a gate wiring 402. Next, a source region 401a and a drain region 401b are formed by adding an impurity imparting n-type conductivity to a part of the crystalline semiconductor film by using the gate electrode 402 as mask.

Figure 11B:
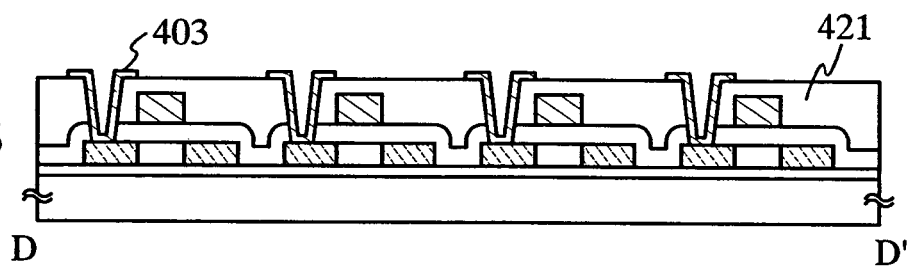

Then, as shown in FIG. 11B, a third insulating film 421 is formed. A film mainly containing silicon and oxygen (a silicon oxide film, a silicon nitride oxide film, a silicon oxynitride film, or the like) formed by a known method (CVD, PVD, or the like) or an organic resin film formed by an application method is used for the third insulating film 421.

Next, the third insulating film 421 and the second insulating film 412 are partly etched to form a conductive film over the first substrate 400. Then, the conductive film is etched into a desired shape-to form a source wiring and a source electrode 403.

Figure 11C:
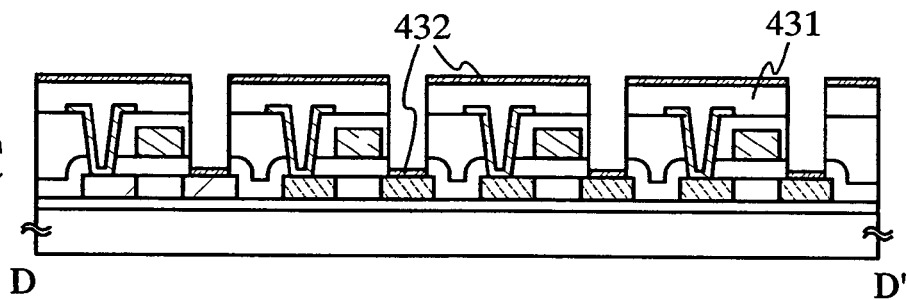

Then, as shown in FIG. 11C, after forming a fourth insulating film 431 over the first substrate 400, the fourth insulating film 431, the third insulating film 421, and the second insulating film 412 are partly etched, so that the semiconductor region is partly exposed. Thereafter, a metal thin film 432 is formed in a film thickness of from 2 nm to 5 nm over the first substrate 400 by a known method (CVD, PVD, or the like). Nickel (Ni), iron (Fe), cobalt (Co), platinum (Pt), titanium (Ti), palladium (Pd), or the like can be used for the metal element.

Next, the metal thin film 432 is heated at from 100° C. to 1100° C., preferably from 400° C. to 600° C. for from 1 hour to 5 hours, and a metal element or a silicide of the metal element is precipitated on a crystal grain boundary (a multipoint).

Figure 11D:
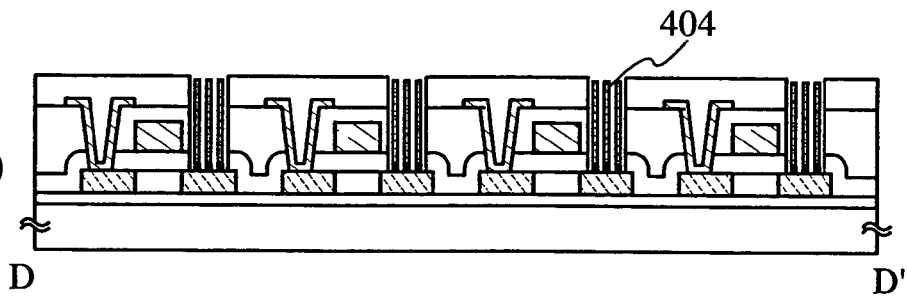

As shown in FIG. 11D, an electron emission portion 404 formed of ultrafine carbon fiber by using the metal element or the silicide of the metal element as a catalyst is formed. The ultrafine carbon fibers are formed by being heated at from 100° C. to 1100° C., preferably from 400° C. to 650° C. in an atmosphere containing hydrocarbon such as methane or acetylene, in which pressure of the atmosphere is reduced to from 1 torr to 760 torr. In addition, the ultrafine carbon fiber can be formed by CVD at from 1 torr to 760 torr by using hydrocarbon such as methane or acetylene as a raw material. In this case, negative voltage may be applied to the substrate side. Through the manufacturing step of the electron emission portion in this embodiment, the diameter and the density of the electron emission portion 404 can be controlled; therefore, it is possible to form a substrate of a FED, which is possible to uniformly discharge an emission current per pixel.

In FIG. 10, the first insulating film 411, the second insulating film 412, the third insulating film 421, and the fourth insulating film 431 shown in FIGS. 11A to 11D are omitted. In addition, in FIGS. 11A to 11D, the source region 401a and the drain region 401b may be insulated after forming and etching the metal thin film 432 without forming the fourth insulating film 431.

The first substrate 400 formed through the above steps and the second substrate 305 shown in FIG. 8 of Embodiment 5 are sealed with an adhesive member, and a portion surrounded with the substrates and the adhesive member is depressurized to form a display panel of a field emission display device.

Thereafter, as shown in FIGS. 8 and 9A to 9E, the field emission display device can be formed.

Through the above steps, a field emission element comprising a semiconductor region having a source region and a drain region, a source electrode and a source wiring which is in contact with the source region, a gate electrode, and an electron emission portion formed of carbon on a surface of the drain region of the semiconductor region is formed. The field emission element formed in this embodiment has a transistor structure, so that there are switching properties in each field emission element. Therefore, a display per pixel can be controlled.

In addition, a switching element such as a thin film transistor or a diode may be provided separately for each field emission element to control accurately ON and OFF of the field emission element.

The field emission element is described using a top gate structure in this embodiment; however, it is not limited thereto, and the field emission element can be formed with a bottom gate structure.

(Embodiment 7)

Here, an application example of an ultrafine carbon fiber described in embodiments is proposed. An ultrafine carbon fiber formed in any one of Embodiments 1 to 3 can be applied to a probe of a Scanning Probe Microscope (SPM) or a channel region of a FET (Field Effect Transistor). In a FET (also referred to as a TUBEFET) in which an ultrafine carbon fiber is used for a channel formation region an insulating film is formed over a conductive layer such as a silicon substrate, a metal film, or a metal substrate and a source electrode and drain electrode formed from gold or platinum is formed thereover. The PET is formed by connecting the electrodes with the ultrafine carbon fiber therebetween. In addition, an ultrafine carbon fiber is applied to a negative electrode material of a lithium battery, a gas occluding substance, or the like by making a use of a structure in one-dimensional pore having substantially large space in a tube or between tubes.

(Embodiment 8)

Here, a semiconductor device using an ultrafine carbon fiber described in embodiments is proposed. A semiconductor device highly integrated a FET (TUBEFET) having an ultrafine carbon fiber formed in any one of Embodiments 1 to 3 in a channel region, typically a semiconductor device such as a signal line driver circuit, a controller, a CPU, a converter of an audio processing circuit, a power supply circuit, a transmission/reception circuit, a memory, an amplifier of an audio processing circuit, a video detection circuit, a video processing circuit, or an audio detection circuit can be formed. Furthermore, a circuit comprising one system (function circuit) such as a MPU (microcomputer), a memory, an I/O interface is mounted in monolithic, so that system-on-chip that is capable of high speed, high reliability, and low power consumption can be formed. Such semiconductor devices or system-on-chip is formed by using an ultrafine carbon fiber manufactured in high reliability; therefore, they can be manufactured with a good yield.

(Embodiment 9)

Various electronic devices can be manufactured by incorporating the semiconductor devices, system-on-chip, display devices, or the like described in the above embodiment into a casing. The electronic devices include a television apparatus, a video camera, a digital camera, a goggle type display (a head mounted display), a navigation system, an audio reproducing device (a car audio, an audio component, and the like), a laptop computer, a game machine, a portable information terminal (a mobile computer, a cellular phone, a portable game machine, an electronic book, and the like), an image reproducing device provided with a recording medium (specifically a device that is capable of playing a recording medium such as a Digital Versatile Disc (DVD) and that has a display device that can display the image) and the like. Here, a television device is shown in FIG. 13 as a typical example of the electronic devices.

Figure 13:
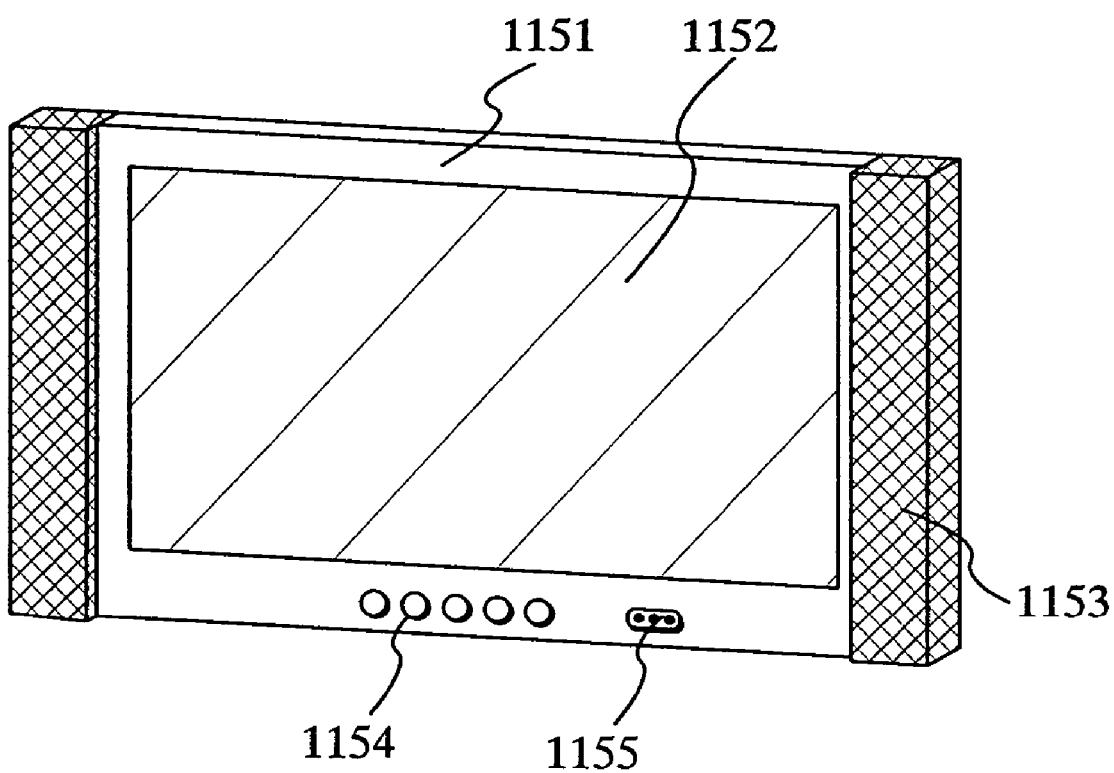
FIG. 13 is a view showing an electronic device.

FIG. 13 is a perspective view of the television apparatus viewed from the front side, which includes a casing 1151, a display portion 1152, speaker portions 1153, operation parts 1154, a video input terminal 1155, and the like.

The display portion 1152 is an example of an image output portion, and an image is displayed here.

The speaker portions 1153 are an example of an audio output portion, and audio is outputted here.

A power source switch, a volume switch, a channel selection switch, a tuner switch, a selection switch, and the like are provided for the operation parts 1154, and ON/OFF of the power source of the television apparatus, selection of an image, adjustment of audio, selection of a tuner, and the like are carried out by pressing these switches. It is also possible to select the above operations by a remote controller type operation part.

The video input terminal 1155 is an input terminal that inputs an external video signal such as a VTR, a DVD, a game machine, and the like to the television apparatus.

When the television apparatus described in this embodiment is a wall-hung television apparatus, a wall-hung location is provided to a rear of a main body.

A high-quality television apparatus without variation can be manufactured by using a display device that is an example of a semiconductor device of the present invention for the display portion of the television apparatus. In addition, the semiconductor device of the invention is used for a video detection circuit, a video processing circuit, an audio detection circuit, and an audio processing circuit as well as a CPU and the like that controls the same, so that the television apparatus can be manufactured in high yield. Accordingly, the television apparatus can be applied as a display medium with a large-sized area such as a wall-hung television apparatus, an information display board at a station, an airport, or the like, or an advertisement display board on the street.

This application is based on Japanese Patent Application serial no. 2003-283827 filed in Japanese Patent Office on Jul. 31 in 2003, the contents of which are hereby incorporated by reference.

Although the invention has been fully described by way of example with reference to the accompanying drawings, it is to be understood that various changes and modifications depart from the scope of the present invention hereinafter defined, they should be construed as being included therein.

What is claimed is:

1. A method for manufacturing an ultrafine carbon fiber comprising the steps of:
    forming a semiconductor film over a surface having an insulating property;
    performing a first treatment so that a metal element or a silicide of the metal element is segregated on a crystal grain boundary of the semiconductor film after adding the metal element in the semiconductor film; and
    performing a second treatment so that an ultrafine carbon fiber on the surface of the metal element or the silicide of the metal element is formed.

2. The method for manufacturing an ultrafine carbon fiber according to claim 1,
    wherein the semiconductor film is an amorphous semiconductor film; and
    wherein the first treatment is further comprising a step of crystallizing the amorphous semiconductor film.

3. The method for manufacturing an ultrafine carbon fiber according to claim 1,
    wherein the semiconductor film is an amorphous semiconductor film; and
    wherein the first treatment is further comprising a step of heating at from 400° C. to 1100° C. or irradiating with a laser beam.

4. The method for manufacturing an ultrafine carbon fiber according to claim 1,
    wherein the semiconductor film is a crystalline semiconductor film; and
    wherein the first treatment is further comprising a step of heating at from 100° C. to 1100° C.

5. The method for manufacturing an ultrafine carbon fiber according to claim 1,
    wherein the second treatment is further comprising a step of heating at from 100° C. to 1100° C. in an atmosphere in which hydrocarbon is contained.

6. The method for manufacturing an ultrafine carbon fiber according to claim 1,
    wherein the second treatment is performed by CVD using hydrocarbon as a raw material.

7. The method for manufacturing an ultrafine carbon fiber according to claim 1,
    wherein the crystal grain boundary is a multipoint of a crystal grain.

8. The method for manufacturing an ultrafine carbon fiber according to claim 1,
    wherein the ultrafine carbon fiber is dissociated from the semiconductor film after forming the ultrafine carbon fiber.

9. The method for manufacturing an ultrafine carbon fiber according to claim 1,
    wherein the metal element is nickel, iron, cobalt, or platinum.

10. The method for manufacturing an ultrafine carbon fiber according to claim 1,
    wherein the ultrafine carbon fiber is a graphite nanofiber, a carbon nanofiber, a carbon nanotube, tubular graphite, a carbon nanocone, or corn shape graphite.

11. A method for manufacturing a field emission element comprising the steps of:
    forming a semiconductor film over a surface having an insulating property;
    performing a first treatment so that a metal element or a silicide of the metal element is segregated on a crystal grain boundary of the semiconductor film after adding the metal element in the semiconductor film; and
    performing a second treatment so that an electron emission portion formed of an ultrafine carbon fiber on the surface of the metal element or the silicide of the metal element is formed.

12. The method for manufacturing a field emission element according to claim 11,
    wherein the semiconductor film is formed in stripe.

13. A method for manufacturing a field emission element comprising the steps of:
    forming a semiconductor film in a desired shape over a surface having an insulating property;
    forming a first insulating film over the semiconductor film;
    forming a first conductive film in a desired shape over the first insulating film;
    exposing the semiconductor film by partly removing the first conductive film and the first insulating film;
    performing a first treatment so that a metal element or a silicide of the metal element is segregated on a crystal grain boundary of the semiconductor film after forming a metal thin film on the exposed semiconductor film; and
    performing a second treatment so that an electron emission portion formed of an ultrafine carbon fiber is formed on the surface of the metal element or the silicide of the metal element.

14. The method for manufacturing a field emission element according to claim 13,
    wherein the first conductive film in the desired shape is orthogonal to the semiconductor film in the desired shape through the first insulating film.

15. The method for manufacturing a field emission element according to claim 13, wherein the first conductive film in the desired shape and the semiconductor film in a desired shape are in stripe.

16. The method for manufacturing a field emission element according to claim 13,
wherein the semiconductor film imparts n-type conductivity.

17. The method for manufacturing a field emission element according to claim 13,
wherein the semiconductor film is an amorphous semiconductor film; and
wherein the first treatment is further comprising a step of crystallizing the amorphous semiconductor film.

18. The method for manufacturing a field emission element according to claim 13,
wherein the semiconductor film is an amorphous semiconductor film; and
wherein the first treatment is further comprising a step of heating at from 400° C. to 1100° C. or irradiating with a laser beam.

19. The method for manufacturing a field emission element according to claim 13,
wherein the semiconductor film is a crystalline semiconductor film; and
wherein the first treatment is further comprising a step of heating at from 100° C. to 1100° C.

20. The method for manufacturing a field emission element according to claim 13,
wherein the second treatment is further comprising a step of heating at from 100° C. to 1100° C. in an atmosphere in which hydrocarbon is contained.

21. The method for manufacturing a field emission element according to claim 13,
wherein the second treatment is performed by CVD using hydrocarbon as a raw material.

22. The method for manufacturing a field emission element according to claim 13,
wherein the crystal grain boundary is a multipoint of a crystal grain.

23. The method for manufacturing a field emission element according to claim 13,
wherein the metal element is nickel, iron, cobalt, platinum, titanium, or palladium.

24. The method for manufacturing a field emission element according to claim 13,
wherein the electron emission portion formed of the ultrafine carbon fiber is a graphite nanofiber, a carbon nanofiber, a carbon nanotube, tubular graphite, a carbon nanocone, or corn shape graphite.

25. A method for manufacturing a field emission element comprising the steps of:
forming a semiconductor film in a desired shape over a surface having an insulating property;
forming a first insulating film over the semiconductor film;
forming a first conductive film in a desired shape over the first insulating film;
forming a source region and a drain region in the semiconductor film;
forming a second insulating film over the first insulating film;
exposing the source region of the semiconductor film by partly removing the second insulating film and the first insulating film;
forming a second conductive film over the source region;
exposing the drain region of the semiconductor film by partly removing the second insulating film and the first insulating film;
forming a metal thin film over the drain region;
performing a first treatment so that a metal element or a silicide of the metal element on a crystal grain boundary of the semiconductor film is segregated; and
performing a second treatment so that an electron emission portion formed of an ultrafine carbon fiber on the surface of the metal element or the silicide of the metal element is formed.

26. The method for manufacturing a field emission element according to claim 25,
wherein the source region and the drain region of the semiconductor film imparts n-type conductivity.

27. The method for manufacturing a field emission element according to claim 25,
wherein the first conductive film is a gate electrode and the second conductive film is a source electrode.

28. The method for manufacturing a field emission element according to claim 25,
wherein the semiconductor film is an amorphous semiconductor film; and
wherein the first treatment is further comprising a step of crystallizing the amorphous semiconductor film.

29. The method for manufacturing a field emission element according to claim 25,
wherein the semiconductor film is an amorphous semiconductor film; and
wherein the first treatment is further comprising a step of heating at from 400° C. to 1100° C. or irradiating with a laser beam.

30. The method for manufacturing a field emission element according to claim 25,
wherein the semiconductor film is a crystalline semiconductor film; and
wherein the first treatment is further comprising a step of heating at from 100° C. to 1100° C.

31. The method for manufacturing a field emission element according to claim 25,
wherein the second treatment is further comprising a step of heating at from 100° C. to 1100° C. in an atmosphere in which hydrocarbon is contained.

32. The method for manufacturing a field emission element according to claim 25,
wherein the second treatment is performed by CVD using hydrocarbon as a raw material.

33. The method for manufacturing a field emission element according to claim 25,
wherein the crystal grain boundary is a multipoint of a crystal grain.

34. The method for manufacturing a field emission element according to claim 25,
wherein the metal element is nickel, iron, cobalt, platinum, titanium, or palladium.

35. The method for manufacturing a field emission element according to claim 25,
wherein the electron emission portion formed of the ultrafine carbon fiber is a graphite nanofiber, a carbon nanofiber, a carbon nanotube, tubular graphite, a carbon nanocone, or corn shape graphite.

* * * * *